(12) United States Patent
Lee et al.

(10) Patent No.: US 7,369,210 B2
(45) Date of Patent: *May 6, 2008

(54) APPARATUS AND METHOD FOR MANUFACTURING LIQUID CRYSTAL DISPLAY DEVICE USING UNITARY VACUUM PROCESSING CHAMBER

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 441 days.

This patent is subject to a terminal disclaimer.

(21) Appl. No.: 10/917,486

(22) Filed: Aug. 13, 2004

(65) Prior Publication Data

US 2005/0011609 A1    Jan. 20, 2005

Related U.S. Application Data

(63) Continuation of application No. 10/126,963, filed on Apr. 22, 2002, now Pat. No. 6,829,032.

(30) Foreign Application Priority Data

Feb. 6, 2002    (KR) ................. P2002-6640

(51) Int. Cl.
  *G02F 1/1341* (2006.01)
  *G02F 1/1339* (2006.01)
(52) U.S. Cl. .................... 349/187; 349/189; 349/190
(58) Field of Classification Search ............ 349/187, 349/189, 190
  See application file for complete search history.

(56) References Cited

U.S. PATENT DOCUMENTS 3,978,580 A    9/1976    Leupp et al.
4,094,058 A    6/1978    Yasutake et al.
4,653,864 A    3/1987    Baron et al.
4,691,995 A    9/1987    Yamazaki et al.
4,775,225 A    10/1988    Tsuboyama et al.
5,247,377 A    9/1993    Omeis et al.
5,263,888 A    11/1993    Ishihara et al.
5,379,139 A    1/1995    Sato et al.
5,406,989 A    4/1995    Abe
5,499,128 A    3/1996    Hasegawa et al.
5,507,323 A    4/1996    Abe
5,511,591 A    4/1996    Abe (Continued)

FOREIGN PATENT DOCUMENTS

CN    1234524 A    11/1999

(Continued)

OTHER PUBLICATIONS

Machine translation of JP 2001-264782 to Oshima et al.*

*Primary Examiner*—Andrew Schechter
(74) *Attorney, Agent, or Firm*—McKenna, Long & Aldridge LLP (57) ABSTRACT

An apparatus for manufacturing a liquid crystal display device includes a vacuum processing chamber having a single substrate entrance for loading and unloading first and second substrates, upper and lower stages disposed within the vacuum processing chamber for affixing the first and second substrates, and a stage moving system for providing relative movement of the upper and lower stages.

11 Claims, 8 Drawing Sheets

U.S. PATENT DOCUMENTS

| | | | |
|---|---|---|---|
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | Von Gutfeld et al. | |
| 6,163,357 A | 12/2000 | Nakamura | |
| 6,205,368 B1 | 3/2001 | Hirahara et al. | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,829,032 B2 * | 12/2004 | Lee et al. ................... | 349/187 |
| 7,256,860 B2 * | 8/2007 | Lee et al. ................... | 349/187 |
| 2001/0021000 A1 | 9/2001 | Egami | |
| 2002/0008838 A1 | 1/2002 | Matsuda | |

FOREIGN PATENT DOCUMENTS

| | | |
|---|---|---|
| EP | 1 003 066 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-054225 | 3/1987 |
| JP | 62-054228 | 3/1987 |
| JP | 62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 03-009549 | 1/1991 |
| JP | 05-036425 | 2/1993 |
| JP | 05-036426 | 2/1993 |
| JP | 5-059546 | 3/1993 |
| JP | 05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 06-064229 | 3/1994 |
| JP | 6-148657 | 5/1994 |
| JP | 6-160871 | 6/1994 |
| JP | 06-194637 | 7/1994 |
| JP | 6-235925 | 8/1994 |
| JP | 6-265915 | 9/1994 |
| JP | 6313870 | 11/1994 |
| JP | 7-84268 | 3/1995 |
| JP | 7-128674 | 5/1995 |
| JP | 7-181507 | 7/1995 |
| JP | 07-275770 | 10/1995 |
| JP | 07-275771 | 10/1995 |
| JP | 08-076133 | 3/1996 |
| JP | 9-61829 | 3/1996 |
| JP | 8-95066 | 4/1996 |
| JP | 8-101395 | 4/1996 |
| JP | 8-106101 | 4/1996 |
| JP | 08-110504 | 4/1996 |
| JP | 08-136937 | 5/1996 |
| JP | 8-171094 | 7/1996 |
| JP | 08-173874 | 7/1996 |
| JP | 8-190099 | 7/1996 |
| JP | 8-240807 | 9/1996 |
| JP | 09-001026 | 1/1997 |
| JP | 9-5762 | 1/1997 |
| JP | 9-26578 | 1/1997 |
| JP | 9-73075 | 3/1997 |
| JP | 9-73096 | 3/1997 |
| JP | 09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |

| | | | | | | |
|---|---|---|---|---|---|---|
| JP | 2001-91727 | 4/2001 | | JP | 2002-107740 | 4/2002 |
| JP | 2001-117105 | 4/2001 | | JP | 2002-122870 | 4/2002 |
| JP | 2001-117109 | 4/2001 | | JP | 2002-122872 | 4/2002 |
| JP | 2001-133745 | 5/2001 | | JP | 2002-122873 | 4/2002 |
| JP | 2001-133794 | 5/2001 | | JP | 2002-131762 | 5/2002 |
| JP | 2001-133799 | 5/2001 | | JP | 2002-139734 | 5/2002 |
| JP | 2001-142074 | 5/2001 | | JP | 2002-156518 | 5/2002 |
| JP | 2001-147437 | 5/2001 | | JP | 2002-169166 | 6/2002 |
| JP | 2001-154211 | 6/2001 | | JP | 2002-169167 | 6/2002 |
| JP | 2001-166272 | 6/2001 | | JP | 2002-182222 | 6/2002 |
| JP | 2001-166310 | 6/2001 | | JP | 2002-202512 | 7/2002 |
| JP | 2001-183683 | 7/2001 | | JP | 2002-202514 | 7/2002 |
| JP | 2001-201750 | 7/2001 | | JP | 2002-214626 | 7/2002 |
| JP | 2001-209052 | 8/2001 | | JP | 2002-229042 | 8/2002 |
| JP | 2001-209056 | 8/2001 | | JP | 2002-236276 | 8/2002 |
| JP | 2001-209057 | 8/2001 | | JP | 2002-258299 | 8/2002 |
| JP | 2001-209058 | 8/2001 | | JP | 2002-236292 | 9/2002 |
| JP | 2001-209060 | 8/2001 | | JP | 2002-277865 | 9/2002 |
| JP | 2001-215459 | 8/2001 | | JP | 2002-277866 | 9/2002 |
| JP | 2001-222017 | 8/2001 | | JP | 2002-277881 | 9/2002 |
| JP | 2001-235758 | 8/2001 | | JP | 2002-287156 | 10/2002 |
| JP | 2001-255542 | 9/2001 | | JP | 2002-296605 | 10/2002 |
| JP | 2001-264782 | 9/2001 | | JP | 2002-311438 | 10/2002 |
| JP | 2001-272640 | 10/2001 | | JP | 2002-311440 | 10/2002 |
| JP | 2001-281675 | 10/2001 | | JP | 2002-311442 | 10/2002 |
| JP | 2001-281678 | 10/2001 | | JP | 2002-323687 | 11/2002 |
| JP | 2001-282126 | 10/2001 | | JP | 2002-323694 | 11/2002 |
| JP | 2001-330837 | 10/2001 | | JP | 2002-333628 | 11/2002 |
| JP | 2001-305563 | 11/2001 | | JP | 2002-333635 | 11/2002 |
| JP | 2001-330840 | 11/2001 | | JP | 2002-333843 | 11/2002 |
| JP | 2001-356353 | 12/2001 | | JP | 2002-341329 | 11/2002 |
| JP | 2001-356354 | 12/2001 | | JP | 2002-341355 | 11/2002 |
| JP | 2002-14360 | 1/2002 | | JP | 2002-341356 | 11/2002 |
| JP | 2002-23176 | 1/2002 | | JP | 2002-341357 | 11/2002 |
| JP | 2002-49045 | 2/2002 | | JP | 2002-341358 | 11/2002 |
| JP | 2002-079160 | 3/2002 | | JP | 2002-341359 | 11/2002 |
| JP | 2002-080321 | 3/2002 | | JP | 2002-341362 | 11/2002 |
| JP | 2002-82340 | 3/2002 | | | | |
| JP | 2002-90759 | 3/2002 | | | | |
| JP | 2002-90760 | 3/2002 | | | | |

\* cited by examiner

APPARATUS AND METHOD FOR MANUFACTURING LIQUID CRYSTAL DISPLAY DEVICE USING UNITARY VACUUM PROCESSING CHAMBER

This is a continuation of application Ser. No. 10/126,963, filed on Apr. 22, 2002 now U.S. Pat. No. 6,829,032.

The present invention claims the benefit of the Korean Patent Application No. P2002-06640 filed on Feb. 6, 2002, which is hereby incorporated by reference.

BACKGROUND OF THE INVENTION

1. Field of the Invention

The present invention relates to a manufacturing apparatus and method, and more particularly, to an apparatus and method for manufacturing a liquid crystal display device suitable for a large-sized liquid crystal display.

2. Discussion of the Related Art

In general, recent developments in the information communication field have increased demand for various types of displays devices. In response to this demand, various flat panel type displays such as liquid crystal display (LCD), plasma display panel (PDP), electro-luminescent display (ELD), and vacuum fluorescent display (VFD) have been developed to replace conventional cathode ray tube (CRT) devices. In particular, LCD devices have been used because of their high resolution, light weight, thin profile, and low power consumption. In addition, LCD devices have been implemented in mobile devices such as monitors for notebook computers. Furthermore, LCD devices have been developed for monitors of computer and television to receive and display broadcasting signals.

Accordingly, efforts to improve image quality of LCD devices contrast with the benefits of high resolution, light weight, thin profile, and low power consumption. In order to incorporate LCD devices as a general image display, image quality such as fineness, brightness, large-sized area, for example, must be realized.

A plurality of gate lines are formed along one direction at fixed intervals on the first glass substrate (TFT array substrate), and a plurality of data lines are formed along a second direction perpendicular to one direction of the plurality of gate lines, thereby defining a plurality of pixel regions. Then, a plurality of pixel electrodes are formed in a matrix arrangement at the pixel regions, and a plurality of thin film transistors (TFT) are formed at the pixel regions. Accordingly, the plurality of thin film transistors are switched by signals transmitted along the gate lines and transfer signals transmitted along the data lines to each pixel electrode. In order to prevent light leakage, black matrix films are formed on the second glass substrate (color filter substrate) except at regions of the second glass substrate that correspond to the pixel regions of the first glass substrate.

A process for manufacturing an LCD device using a TFT substrate and a color filter substrate will be described with reference to a manufacturing apparatus according to the related art.

The process for manufacturing an LCD device according to the related art includes steps of forming a sealant pattern on one of a first and second substrate to form an injection inlet, bonding the first and second substrates to each other within a vacuum processing chamber, and injecting liquid crystal material through the injection inlet in the other vacuum chamber. In another process of manufacturing an LCD device according to the prior art, a liquid crystal dropping method, which is disclosed in Japanese Patent Application No. 11-089612 and 11-172903, includes steps of dropping liquid crystal material on a first substrate, arranging a second substrate over the first substrate, and moving the first and second substrates, thereby bonding the first and second substrates to each other. Compared to the liquid crystal injection method, the liquid crystal dropping method is advantageous in that various steps such as, formation of a liquid crystal material injection inlet, injection of the liquid crystal material, and sealing of the injection inlet are unnecessary since the liquid crystal material is predisposed on the first substrate.

Figure 1:
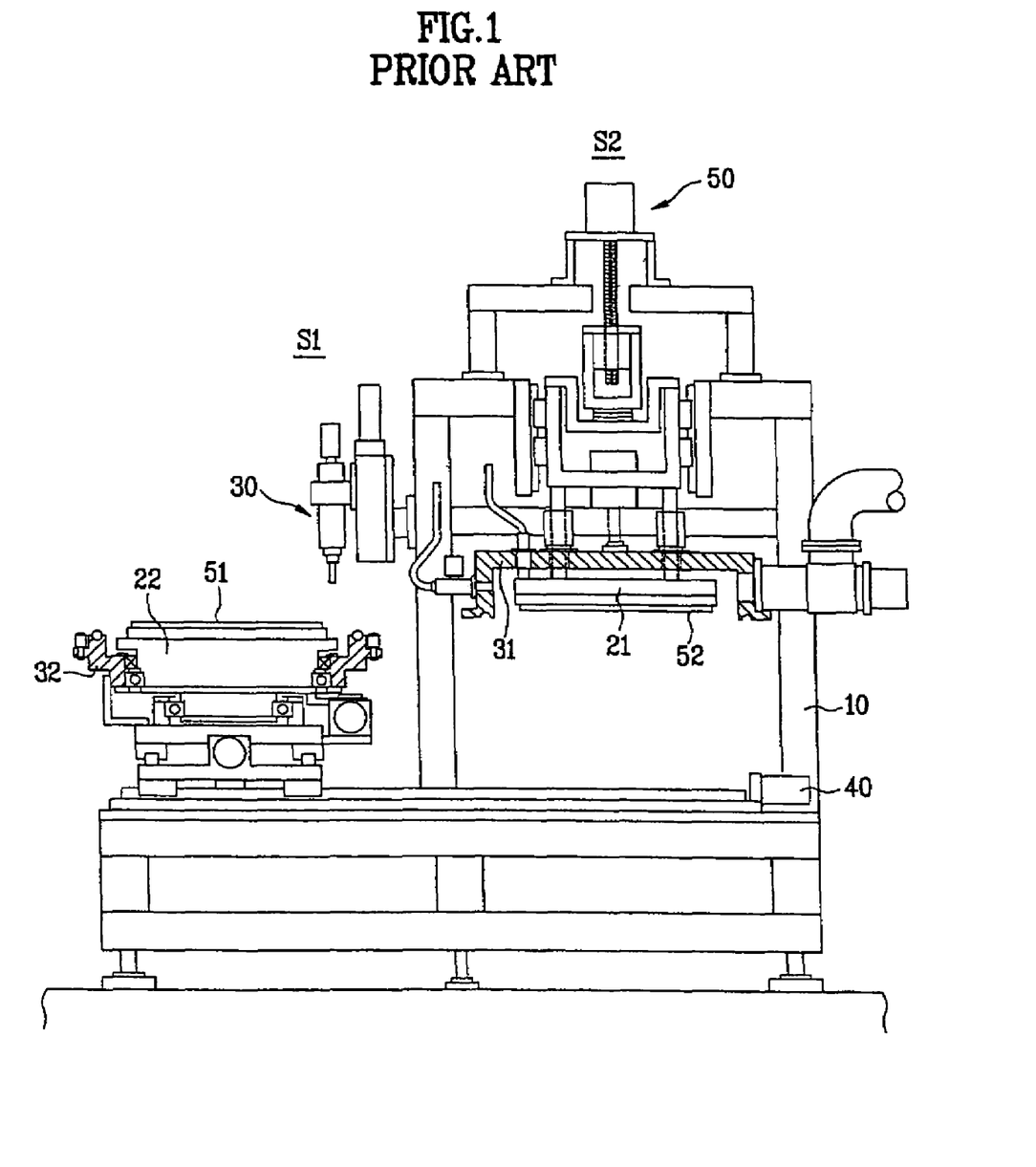
FIG. 1 shows a cross sectional view of a substrate bonding device prior to sealing of upper and lower chamber units according to the prior art.
Figure 2:
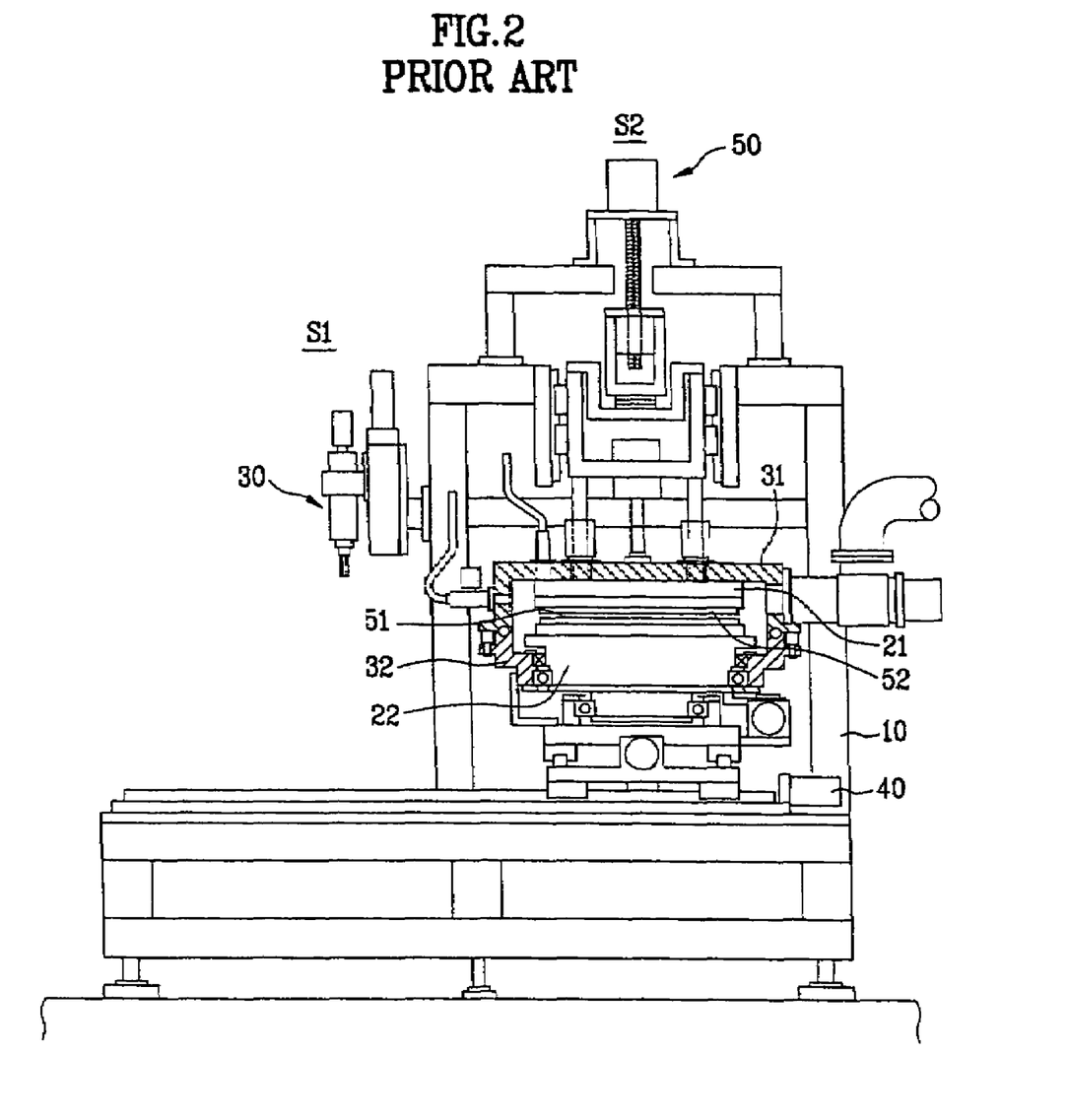
FIG. 2 shows a cross section view of the substrate bonding device during substrate bonding according to the prior art.

FIGS. 1 and 2 show cross sectional views of a substrate bonding device using the liquid crystal dropping method according to the prior art. In FIG. 1, the substrate bonding device includes a frame 10, an upper stage 21, a lower stage 22, a sealant dispensor (not shown), a liquid crystal material dispenser 30, a processing chamber includes an upper chamber unit 31 and a lower chamber unit 32, a chamber moving system 40, and a stage moving system 50. The chamber moving system 40 includes a driving motor driven to selectively move the lower chamber unit 32 to a location at which the bonding process is carried out, or to a location at which outflow of the sealant occurs and dropping of the liquid crystal material. The stage moving system 50 includes another driving motor driven to selectively move the upper stage 21 along a vertical direction perpendicular to the upper and lower stages 21 and 22.

A process of manufacturing an LCD device using the substrate bonding apparatus according to the prior art follows. In FIG. 1 First, a second substrate 52 is placed upon the upper stage 21, and a first substrate 51 is placed upon the lower state 22. Then, the lower chamber unit 32 having the lower stage 22 is moved to a processing location (S1) by the chamber moving system 40 for sealant dispensing and liquid crystal material dispensing. In FIG. 2 Subsequently, the lower chamber unit 32 is moved to a processing location (S2) for substrate bonding by the chamber moving system 40. Thereafter, the upper and lower chamber units 31 and 32 are assembled together by the chamber moving system 40 to form a vacuum tight seal, and a pressure in the chamber is reduced by a vacuum generating system (not shown). Once a sufficient pressure is attained, the upper stage 21 is moved downwardly by the stage moving system 50 to fasten the second substrate 52 to the first substrate 51, and a continuous pressurization of the chamber completes the manufacture of the LCD device.

Unfortunately, the substrate bonding apparatus according to the prior art is disadvantageous. First, the substrate bonding apparatus according the prior art fails to dispense sealant and liquid crystal material on a substrate on which thin film transistors and a color filter are formed. Second, an overall size of the bonding apparatus fails to allow for other processing, thereby making it difficult in designing a layout for a manufacturing process of a liquid crystal display device. Third, due to performing multiple processes using a lower chamber unit, processing time is greatly increased, thereby decreasing overall productivity. According to the prior art, the amount of time to dispense the sealant on the first substrate, to dispense the liquid crystal material on the second substrate, and to bond the first and second substrates, results in significant amounts of time in which all of the manufacturing processes are sequentially performed and completed. Fourth, if a vacuum tight connection between the upper and lower chamber units is not attained, airflow will occur between the upper and lower chamber units, thereby resulting in a poor bond between the first and second substrates. Accordingly, additional components for assuring a vacuum tight seal between the upper and lower chamber units is required. Finally, alignment of the first and second substrates during bonding is difficult because of horizontal movement of the lower chamber unit, thereby increasing overall processing time.

SUMMARY OF THE INVENTION

Accordingly, the present invention is directed to an apparatus and method for bonding a liquid crystal display device, a method for using the apparatus, and a device produced by the method that substantially obviates one or more of the problems due to limitations and disadvantages of the prior art.

An object of the present invention is to provide an apparatus and method for a manufacturing a large-sized liquid crystal display device having a moving range and a direction of each stage for an alignment of the substrates.

Another object of the present invention is provide a liquid crystal display device made by the apparatus and method for manufacturing a large-sized liquid crystal display device.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an apparatus for manufacturing a liquid crystal display device includes a unitary vacuum processing chamber having a substrate entrance, a loader part to carry and affix first and second substrates through the substrate entrance, one of the first and second substrates having a liquid crystal material disposed thereupon, upper and lower stages disposed within the vacuum processing chamber for affixing the first and second substrates, a stage moving system for providing relative movement between the upper and lower stages, and a vacuum generating system for evacuating an interior of the vacuum processing chamber.

In another aspect, a method for manufacturing a liquid crystal display device includes loading first and second substrates through a substrate entrance of a unitary vacuum processing chamber, one of the first and second substrates having a liquid crystal material disposed thereupon, providing relative movement between the upper and lower stages, evacuating an interior of the vacuum processing chamber, and bonding the first and second substrates together with the liquid crystal material disposed therebetween.

In another aspect, a liquid crystal display device manufactured by a method including loading first and second substrates through a substrate entrance of a unitary vacuum processing chamber, one of the first and second substrates having a liquid crystal material disposed thereupon, providing relative movement between the upper and lower stages, evacuating an interior of the vacuum processing chamber, and bonding the first and second substrates together with the liquid crystal material disposed therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 3:
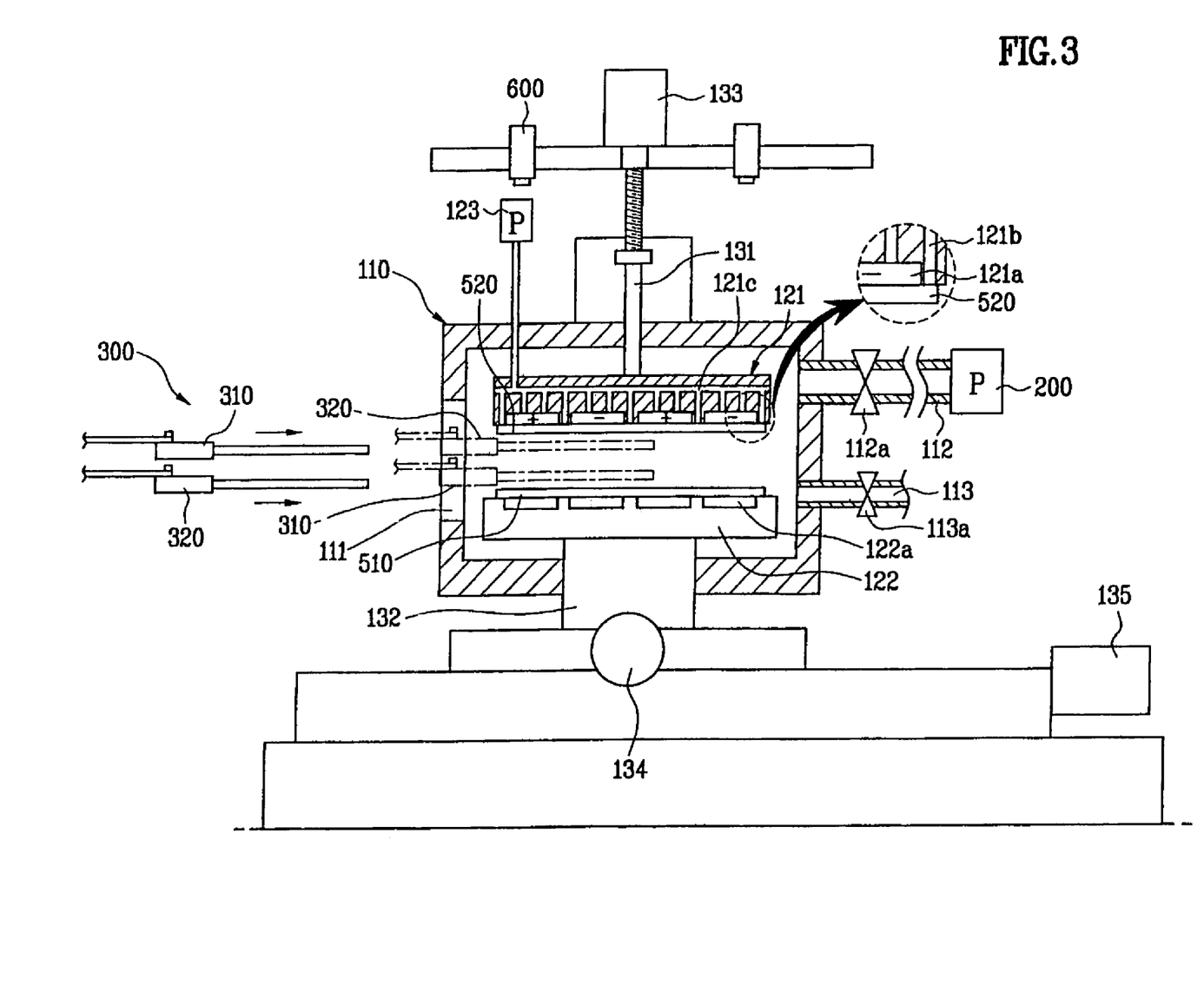
FIG. 3 shows an exemplary apparatus for manufacturing a liquid crystal display device during a loading process according to the present invention.

FIG. 3 shows an exemplary apparatus for manufacturing a liquid crystal display device during a loading process according to the present invention. In FIG. 3, the apparatus may include a vacuum processing chamber 110, an upper stage 121, a lower stage 122, an upper stage moving axis 131, a lower stage rotational axis 132, an upper stage driving motor 133, a lower stage driving motor 134, a vacuum generating system 200, and a loader part 300.

The vacuum processing chamber 110 may be connected to the vacuum generating system 200 by an air outlet 112 via an air outlet valve 112a for reducing a pressure of an interior of the vacuum processing chamber 110. The vacuum processing chamber may include a vent pipe 113 for increasing the pressure of the interior of the vacuum processing chamber 110 via introduction of air or gas through a vent pipe valve 113a. Accordingly, the vacuum processing chamber may include a vacuum processing chamber entrance 111 to allow for introduction and extraction of a first substrate 510 and a second substrate 520 by the loader part 300.

The upper and lower stages parts 121 and 122 may be provided at upper and lower portions of the vacuum processing chamber 110, respectively. The upper and lower stages 121 and 122 may include an electrostatic chuck (ESC) 121a and 122a provided at a opposing surfaces of the upper and lower stages 121 and 122, respectively. Accordingly, the upper electrostatic chuck 121a electrostatically attaches the substrate 520 to the upper stage 121, and the lower electrostatic chuck 122a electrostatically attaches the substrate 510 to the lower stage 122. In addition, the upper stage 121 may include a plurality of vacuum holes 121b formed through the upper stage 121, thereby attaching the substrate 520 to the upper stage 121 by forming a vacuum within the plurality of vacuum holes 121b. The upper and lower electrostatic chucks 121a and 122a may be provided with at least one pair of electrostatic plates having different polarities to apply serial power having different polarities. Alternatively, the upper and lower electrostatic chucks 121a and 122a may be provided with electrostatic plates simultaneously having two identical polarities.

The plurality of the vacuum holes 121b may be formed in a center portion and along a circumference of the upper electrostatic chuck 121a, and may be connected to a single or multiple pipes 121c to transmit a vacuum force generated by a vacuum pump 123 connected to the upper stage 121. Alternatively, even though the upper electrostatic chuck 121a and the plurality of vacuum holes 121b may be formed to have a shape similar to the upper stage 121, it may preferable to arrange the upper electrostatic chuck 121a and the plurality of vacuum holes 121b based upon a geometry of the substrate 520 or upon a geometry of a region upon which liquid crystal material is disposed.

The upper stage moving axis 131 drives the upper stage 121, the lower stage rotational axis 132 drives the lower stage 122, and the upper and lower stage driving motors 133 and 134 drive the upper and lower stages 121 and 122, respectively, at inner and outer sides of the vacuum processing chamber 110. A driving system 135 may be provided driving the lower stage 122 during an alignment process for aligning the first and second substrates 510 and 520.

The vacuum generating system 200 may transmit a suction force to generate a vacuum state inside the vacuum processing chamber 110, and may include a suction pump driven to generate a general vacuum force. In addition, the vacuum generating system 200 may be interconnected to the air outlet 112 of the vacuum processing chamber 110.

The loader part 300 may be a mechanical device separate from the vacuum processing chamber 110, and may be provided at the outer side of the vacuum processing chamber 110. The loader part 300 may receive one of the first substrate 510 and the second substrate 520 upon which at least the liquid crystal material is disposed. In addition, the first substrate 510 may include both the liquid crystal material and the sealant. Moreover, the first substrate 510 may include one of a TFT array substrate and a color filter (C/F) substrate, and the second substrate 520 may include another one of the TFT array substrate and the C/F substrate. Then, the loader part 300 may selectively load both of the first and second substrates 510 and 520 into the vacuum processing chamber 110. The loader part 300 may include a first arm 310 to carry the first substrate 510 upon which at least the liquid crystal material is disposed, and a second arm 320 to carry the second substrate 520. During the loading of the first and second substrates 510 and 520, the first arm 310 may be placed over the second arm 320.

An alignment system 600 may be further included to certify an alignment state of the first and second substrates 510 and 520. The alignment system 600 may be provided to at least one of the inner and outer sides of the vacuum processing chamber 110. Since movement of the lower stage 122 may be limited, an alignment state between the first and second substrates 510 and 520 may be accurately and quickly achieved.

Hereinafter, a bonding process of the first and second substrates 510 and 520 using the apparatus for manufacturing a liquid crystal display device according to the present invention will now be explained.

In FIG. 3, the loader part 300 receives one of the first substrate 510 and the second substrate 520 upon which at least a liquid crystal material is disposed at the first arm 310, and an other of the first substrate 510 and the second substrate 520 at the second arm 320. The second arm 320 loads the substrate 520 onto a lower surface of the upper stage 121, and the first arm 310 loads the substrate 510 upon which at least the liquid crystal material is disposed onto an upper surface of the lower stage 122. The substrate 520 may be loaded onto the lower surface of the upper stage 122 before the substrate 510 upon which at least the liquid crystal material is disposed in order to prevent any particles from being deposited upon the substrate 510. During the loading process of the substrate 510, the particles can fall on the substrate 510 on which a liquid crystal material is disposed.

The second arm 320 carries the substrate 520 under the upper stage, and then a vacuum pump 123 is enabled to transmit a vacuum force to each of the plurality of vacuum holes 121b at the upper stage 121. The first arm 310 carries the substrate 510 above the lower stage 122 to affix the substrate 520 to the upper stage 121 from the second arm 320 and a vacuum pump (not shown) is enabled to transmit a vacuum force to each of the plurality of vacuum holes (not shown) at the lower stage 122 to affix the substrate 510 to the lower stage 122 from the first arm 310.

After the loading of the substrates 510 and 520 is completed, shielding door 114 disposed at the vacuum processing chamber entrance 111 is enabled, thereby sealing the vacuum processing chamber entrance 111.

Figure 4:
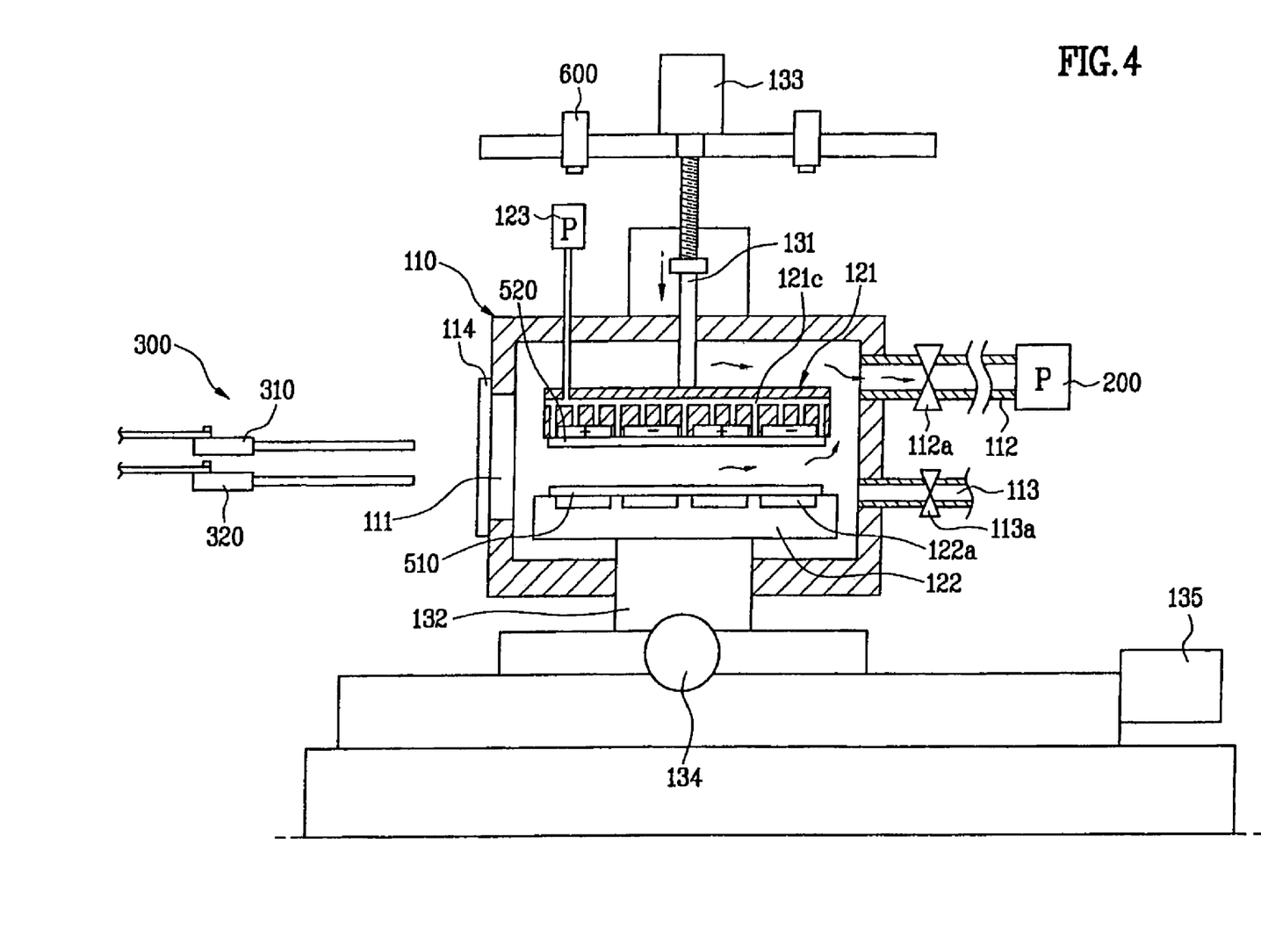
FIG. 4 shows the exemplary apparatus for manufacturing a liquid crystal display device during a vacuum process according to the present invention.

FIG. 4 shows the exemplary apparatus for manufacturing a liquid crystal display device during a vacuum process according to the present invention. In FIG. 4, the vacuum generating system 200 is enabled, and the air outlet valve 112a is opened, thereby evacuating the interior of the vacuum processing chamber 110. Once the interior of the vacuum processing chamber 110 is successfully evacuated to a desired pressure, the vacuum generating system 200 may be disabled, and the air outlet valve 112a may be closed. Accordingly, power may be applied to the upper and lower electrostatic chucks 121a and 122a, thereby affixing the substrates 510 and 520 to the upper and lower stages 121 and 122 by an electrostatic force.

Figure 5:
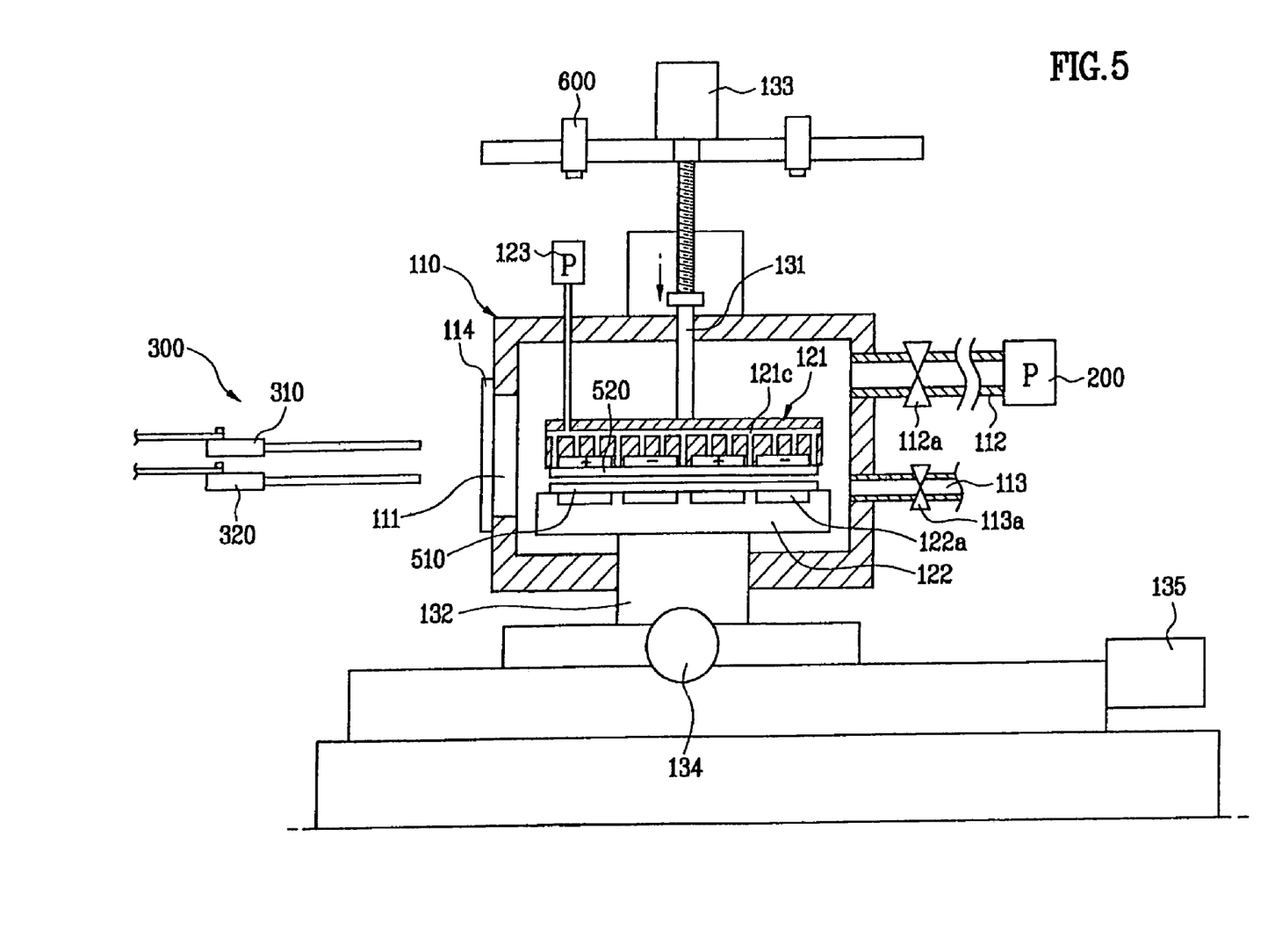
FIG. 5 shows the exemplary apparatus for manufacturing a liquid crystal display device during a location alignment process between substrates according to the present invention.

FIG. 5 shows the exemplary apparatus for manufacturing a liquid crystal display device during a location alignment process between substrates according to the present invention. In FIG. 5, the upper stage driving motor 133 moves the upper stage 121 toward the lower stage 122, so that the upper stage 121 is placed adjacent to the lower stage 122. Then, the alignment system 600 certifies the alignment state of the first and second substrates 510 and 520 that are attached to the upper and lower stages 121 and 122, respectively. The alignment system 600 transmits a control signal to the upper stage moving axis 131 and to the lower stage rotational axis 132, thereby aligning the first and second substrates 510 and 520.

Figure 6:
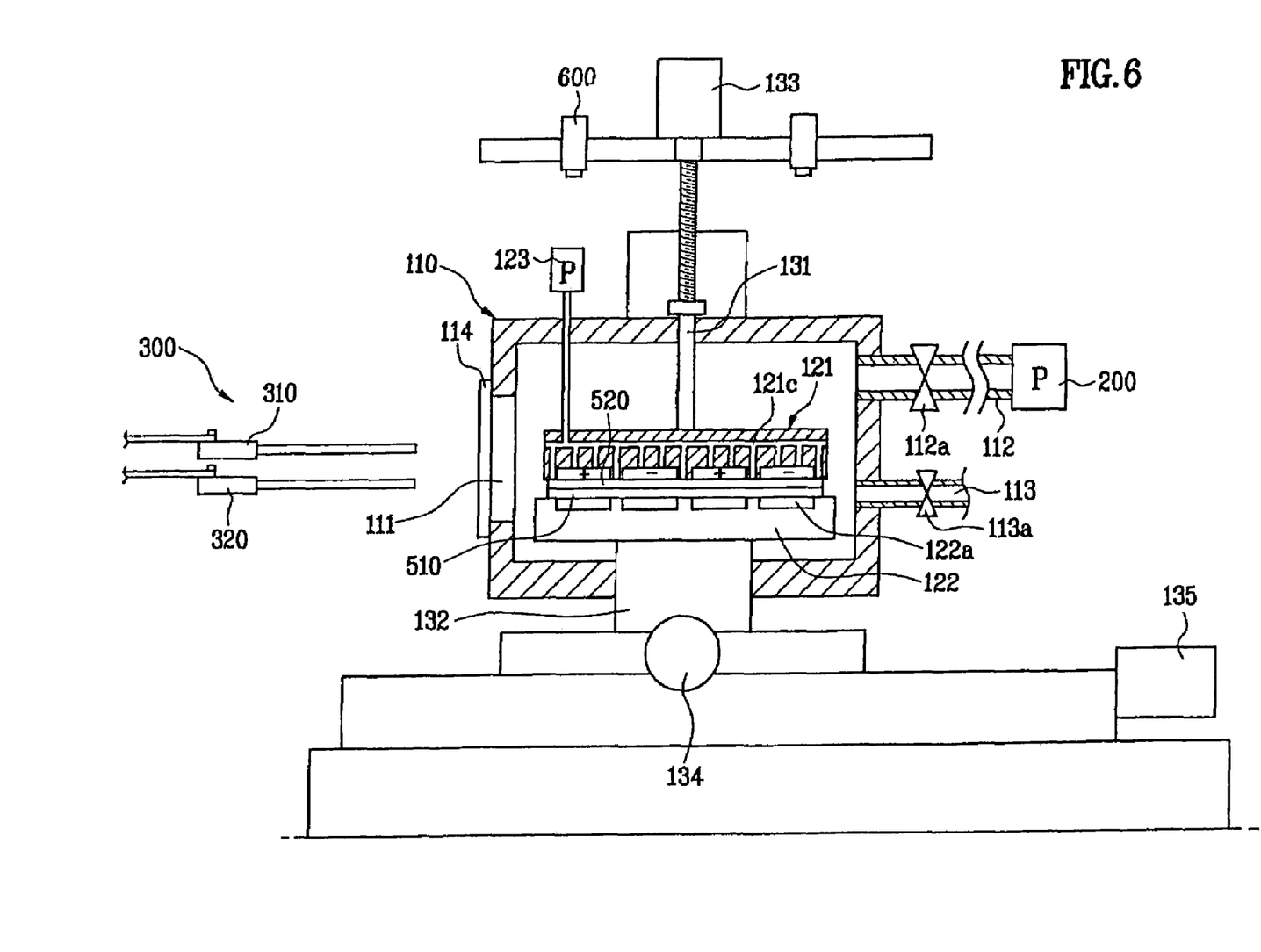
FIG. 6 shows the exemplary apparatus for manufacturing a liquid crystal display device during a bonding process of the substrates according to the present invention.

FIG. 6 shows the exemplary apparatus for manufacturing a liquid crystal display device during a bonding process of the substrates according to the present invention. In FIG. 6, the upper stage moving axis 131 is driven in response to a drive signal received from the alignment system 600, and performs a first bonding process to bond the substrates 510 and 520. However, the first bonding process may not necessarily completely bond the substrates 510 and 520. The first bonding process loosely bonds the substrates 510 and 520 such that air is not to be introduced between the bonded substrates when the pressure of the vacuum processing chamber is increased to atmospheric pressure.

Figure 7:
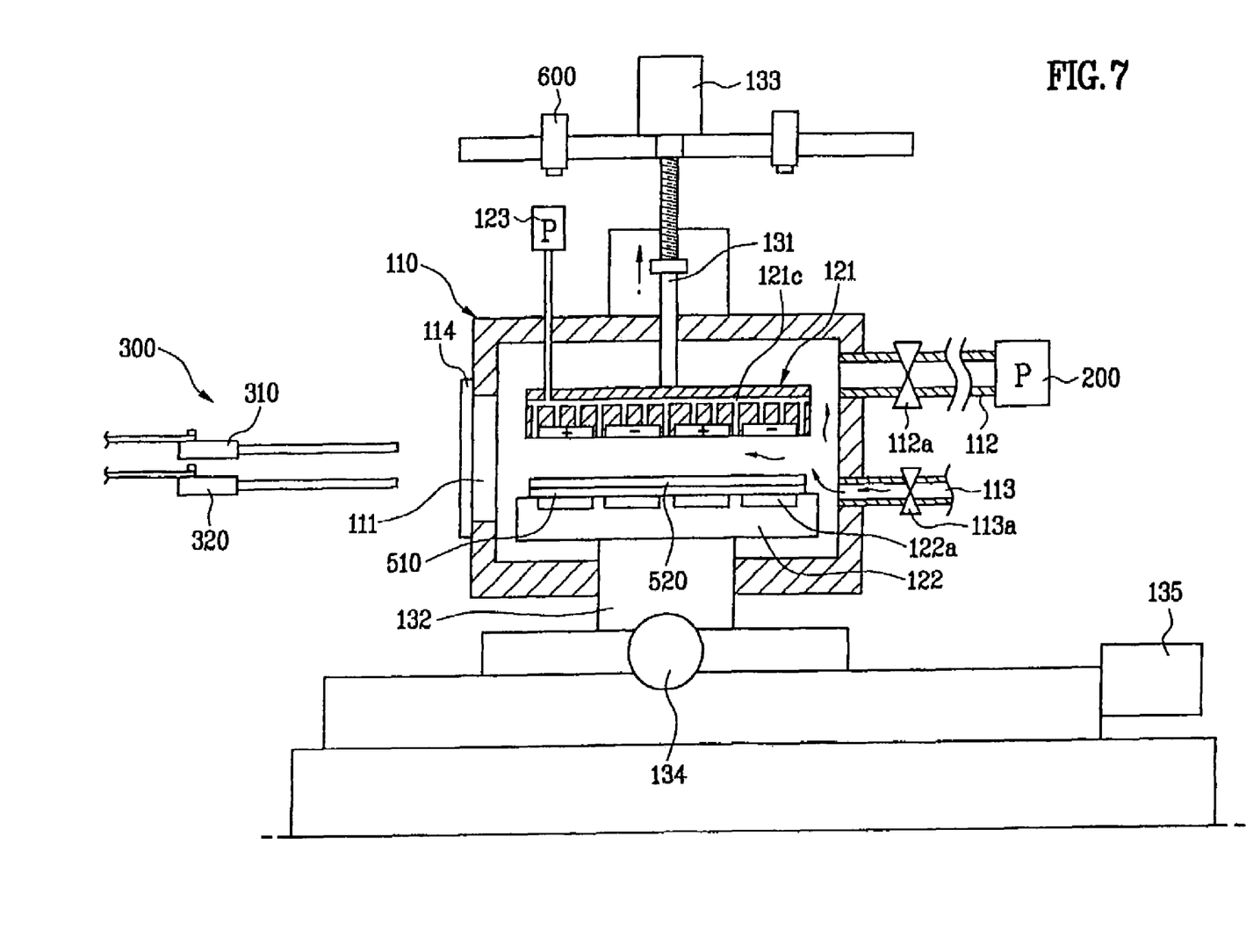
FIG. 7 shows the exemplary apparatus for manufacturing a liquid crystal display device during a further bonding process according to the present invention.

FIG. 7 shows the exemplary apparatus for manufacturing a liquid crystal display device during a further bonding process according to the present invention. In FIG. 7, the vent pipe valve 113a is enabled, thereby allowing the pressure of the interior of the vacuum processing chamber 110 to reach atmospheric pressure. Accordingly, the bonded substrates are further compressed due to the pressure difference between the evacuated interior between the bonded substrates and the atmospheric pressure of the vacuum processing chamber 110.

According to this, more complete bonding process is performed, and if the bonding process is completed, the shielding door 114 of the vacuum processing chamber 110 is operative, so that the entrance 111 closed by the shielding door is opened.

Figure 8:
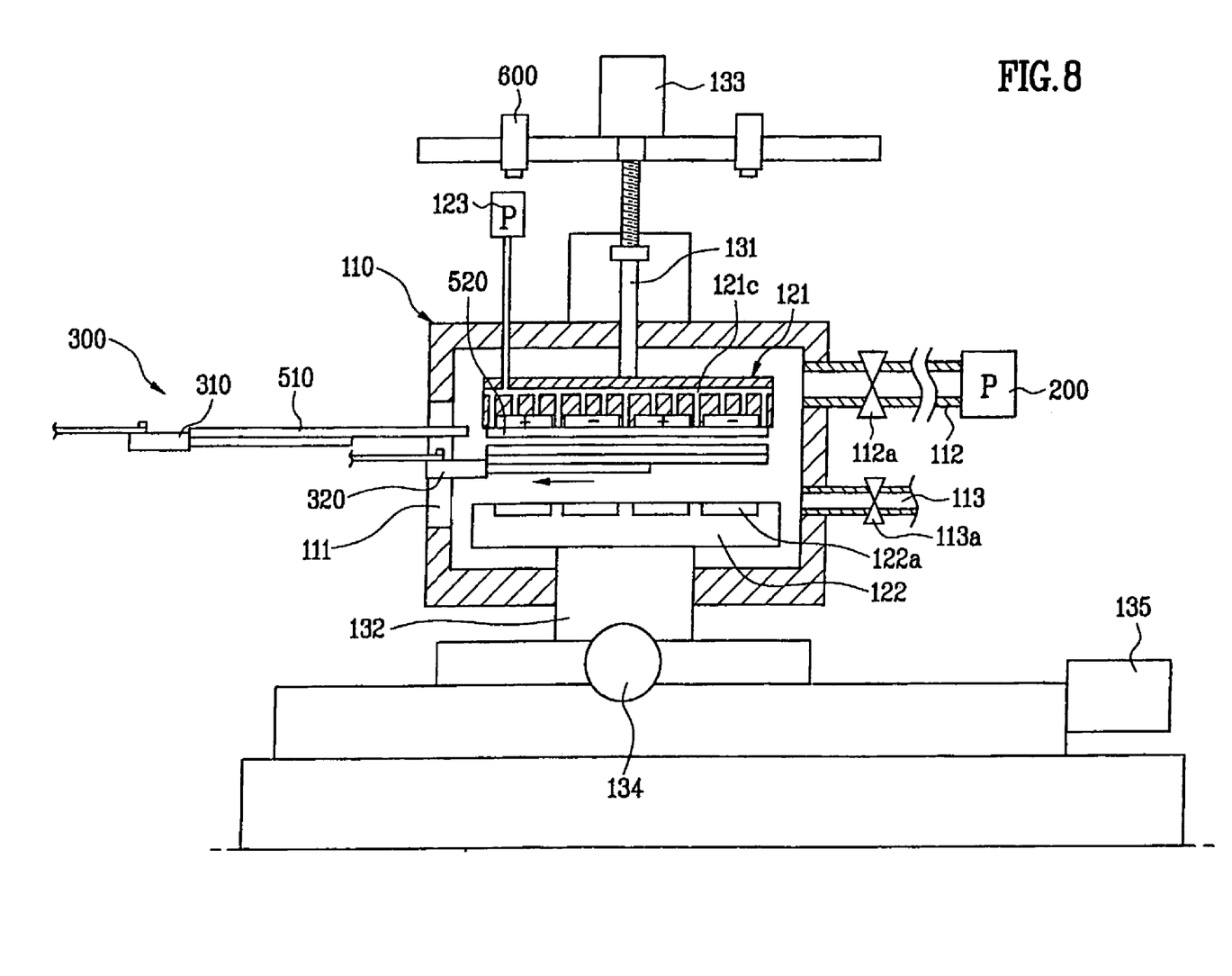
FIG. 8 shows the exemplary apparatus for manufacturing a liquid crystal display device during an unloading process according to the present invention.

FIG. 8 shows the exemplary apparatus for manufacturing a liquid crystal display device during an unloading process according to the present invention. In FIG. 8, unloading of the bonded substrates is performed by the second arm 320 of the loader part 300.

It will be apparent to those skilled in the art than various modifications and variations can be made in the apparatus and method for manufacturing a liquid crystal display device of the present invention. Thus, it is intended that the present invention covers the modifications and variations of this invention provided they come within the scope of the appended claims and their equivalents.

What is claimed is:

1. An apparatus for manufacturing a liquid crystal display device, comprising:
    a vacuum processing chamber having a single substrate entrance for loading and unloading first and second substrates;
    upper and lower stages disposed within the vacuum processing chamber for affixing the first and second substrates;
    a stage moving system for providing relative movement of the upper and lower stages; and
    the apparatus further comprising a loader part including a first arm for loading one of the first and second substrates upon which a liquid crystal material is disposed onto the lower stage through the single substrate entrance, and a second arm for loading another of the first and second substrates onto the upper stage through the single substrate entrance;
    wherein the first arm is positioned over the second arm outside the single substrate entrance.

2. The apparatus according to claim 1, wherein the vacuum processing chamber includes an air outlet and a vent pipe.

3. The apparatus according to claim 1, wherein the single substrate entrance included a shielding door.

4. The apparatus according to claim 1, further comprising first and second drive motors at an exterior of the vacuum processing chamber for providing the relative movement.

5. The apparatus according to claim 4, wherein the first drive motor moves the upper stage along axial direction and the second drive motor moves the lower stage along a rotational axis.

6. A method for manufacturing a liquid crystal display device, comprising the steps of:
    loading first and second substrates through a single substrate entrance of a vacuum processing chamber;
    providing a first relative movement between the upper and lower stages;
    evacuating an interior of the vacuum processing chamber;
    bonding the first and second substrates together;
    providing a second relative movement between the upper and lower stages; and
    removing the bonded first and second substrates from the lower stage through the single substrate entrance;
    wherein the step of loading the first and second substrates includes loading one of the first and second substrates upon which a liquid crystal material is disposed onto the lower stage through the single substrate entrance using a first loading arm, and loading another of the first and second substrates onto the upper stage through the single substrate entrance using a second loading arm;
    wherein the first arm is positioned over the second arm outside of the single substrate entrance.

7. The method according to claim 6, wherein the step of loading first and second substrates include:
    carrying the second substrate and affixing the second substrate to the upper stage;
    carrying the first substrate having a liquid crystal material; and
    affixing the first substrate to the lower stage.

8. The method according to claim 7, wherein the step of affixing the second substrate includes one of enabling at least one electrostatic chuck of supplying a vacuum force to a plurality of vacuum holes provided on a surface of the upper stage.

9. The method according to claim 6, wherein the step of providing the first relative movement includes a first drive a motor for moving the upper stage and a second drive motor for rotating the lower stage.

10. The method according claim 9, wherein both the first and second drive motors are disposed at an exterior of the vacuum processing chamber.

11. The method to claim 6, further comprising aligning the first and second substrates before the step of bonding the first and second substrates.

* * * * *